(12) United States Patent
Li et al.

(10) Patent No.: US 12,210,217 B2
(45) Date of Patent: Jan. 28, 2025

(54) OPTICAL IMAGING SYSTEM

(71) Applicant: Zhejiang Sunny Optics Co., Ltd., Zhejiang (CN)

(72) Inventors: Yang Li, Zhejiang (CN); Lingbo He, Zhejiang (CN); Lin Huang, Zhejiang (CN); Fujian Dai, Zhejiang (CN); Liefeng Zhao, Zhejiang (CN)

(73) Assignee: Zhejiang Sunny Optics Co., Ltd., Zhejiang (CN)

( * ) Notice: Subject to any disclaimer, the term of this patent is extended or adjusted under 35 U.S.C. 154(b) by 524 days.

(21) Appl. No.: 17/569,425

(22) Filed: Jan. 5, 2022

(65) Prior Publication Data

US 2022/0244493 A1 Aug. 4, 2022

(30) Foreign Application Priority Data

Jan. 29, 2021 (CN) .......................... 202110124656.4

(51) Int. Cl.
*G02B 9/64* (2006.01)
*G02B 5/04* (2006.01)
*G02B 13/00* (2006.01)

(52) U.S. Cl.
CPC ................. *G02B 9/64* (2013.01); *G02B 5/04* (2013.01); *G02B 13/0045* (2013.01)

(58) Field of Classification Search
CPC ........ G02B 9/64; G02B 5/04; G02B 13/0045; G02B 13/18
USPC ........................................................ 359/755
See application file for complete search history.

(56) References Cited

U.S. PATENT DOCUMENTS

| | | | |
|---|---|---|---|
| 2018/0335609 A1* | 11/2018 | Chang | G02B 13/18 |
| 2019/0369366 A1* | 12/2019 | Baik | G02B 13/0045 |
| 2020/0257085 A1 | 8/2020 | Yang et al. | |
| 2021/0181484 A1* | 6/2021 | Wang | G02B 13/0045 |
| 2022/0035131 A1* | 2/2022 | Ke | G02B 13/02 |
| 2022/0146789 A1* | 5/2022 | Huang | G02B 9/64 |

FOREIGN PATENT DOCUMENTS

| | | | |
|---|---|---|---|
| CN | 110320640 A | 10/2019 | |
| CN | 112034593 A | * 12/2020 | ......... G02B 13/0045 |
| CN | 212060718 U | 12/2020 | |

* cited by examiner

*Primary Examiner* — Stephone B Allen
*Assistant Examiner* — Boutsikaris Leonidas
(74) *Attorney, Agent, or Firm* — Reising Ethington P.C.

(57) ABSTRACT

The present disclosure discloses an optical imaging system, comprising, sequentially along an optical axis from an object side to an image side, a prism, a diaphragm, a first lens, a second lens, a third lens, a fourth lens, a fifth lens, a sixth lens and a seventh lens, where each of the first lens to the seventh lens has a refractive powers. The prism reflects light incident to the prism along a first direction, to cause the light to emerge from the prism along a second direction. The diaphragm to the seventh lens are sequentially disposed from the prism to the image side along the second direction. The second lens has a positive refractive power, and an image-side surface of the second lens is a concave surface. The third lens has a negative refractive power. The fourth lens has a negative refractive power, and an image-side surface of the fourth lens is a concave surface. The fifth lens has a positive refractive power. At least one of surfaces from an object-side surface of the first lens to an image-side surface of the seventh lens is an aspheric surface.

16 Claims, 8 Drawing Sheets

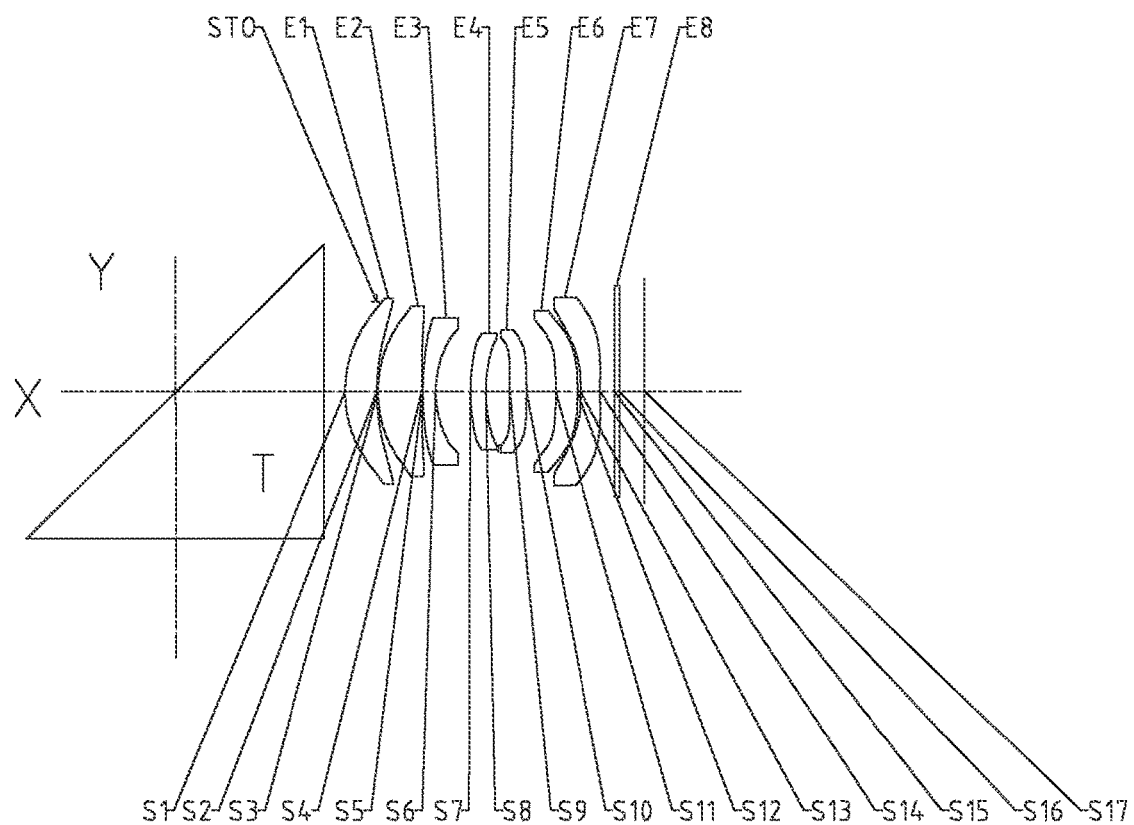
Fig. 5
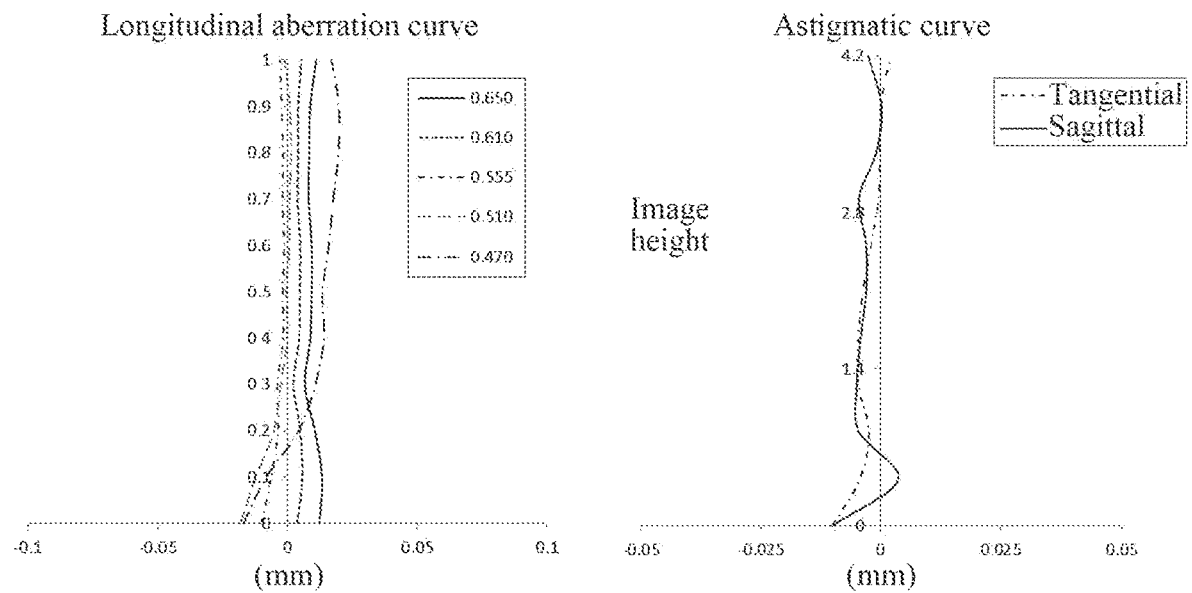
Fig. 6A
Fig. 6B

OPTICAL IMAGING SYSTEM

CROSS-REFERENCE TO RELATED APPLICATIONS

This application claims the priority from Chinese Patent Application No. 202110124656.4, filed in the National Intellectual Property Administration (CNIPA) on Jan. 29, 2021, the contents of which are hereby incorporated by reference in their entirety.

TECHNICAL FIELD

The present disclosure relates to the field of optical element, and specifically to an optical imaging system.

BACKGROUND

In recent years, portable electronic products such as a smartphone have been developing rapidly. Accordingly, users have more and more stringent requirements for the function of the smart phone, etc., especially the shooting function of a mobile phone. With the development trend of miniaturization of the smart phone, the optical imaging system mounted on the smart phone gradually tends to develop in the direction of high-definition, miniaturization, and the like. Traditionally, in order to achieve the high definition of the optical imaging system, it is required to increase the total track length of the optical imaging system to increase the zoom multiple of the optical imaging system. However, this would severely limit the development of miniaturization of the optical imaging system, and thus hinders the development of miniaturization of the smart phone.

SUMMARY

An aspect of the present disclosure is to provide an optical imaging system, which comprises: a prism, reflecting light incident to the prism along a first direction, to cause the light to emerge from the prism along a second direction, wherein the optical imaging system further comprises, sequentially from the prism to an image side along the second direction: a diaphragm; a first lens, having a refractive power; a second lens, having a positive refractive power, an image-side surface of the second lens being a concave surface; a third lens, having a negative refractive power; a fourth lens, having a negative refractive power, an image-side surface of the fourth lens being a concave surface; a fifth lens, having a positive refractive power; a sixth lens, having a refractive power; and a seventh lens, having a refractive power. At least one of surfaces from an object-side surface of the first lens to an image-side surface of the seventh lens is an aspheric surface.

According to an implementation of the present disclosure, an effective focal length f7 of the seventh lens and an effective focal length f2 of the second lens may satisfy: $-3.0<f7/f2<-1.0$.

According to an implementation of the present disclosure, an effective focal length f4 of the fourth lens and a total effective focal length f of the optical imaging system may satisfy:

$$-3.5<f4/f<-1.5.$$

According to an implementation of the present disclosure, a radius of curvature R4 of the image-side surface of the second lens and the effective focal length f2 of the second lens may satisfy: $3.0<R4/f2<5.0$.

According to an implementation of the present disclosure, an effective focal length f3 of the third lens and a radius of curvature R6 of an image-side surface of the third lens may satisfy: $-3.5<f3/R6<-2.0$.

According to an implementation of the present disclosure, a radius of curvature R1 of the object-side surface of the first lens and a radius of curvature R2 of an image-side surface of the first lens may satisfy: $1.5<R2/R1<2.5$.

According to an implementation of the present disclosure, the radius of curvature R4 of the image-side surface of the second lens and a radius of curvature R5 of an object-side surface of the third lens may satisfy: $3.5<R4/R5<5.0$.

According to an implementation of the present disclosure, a radius of curvature R7 of an object-side surface of the fourth lens and a radius of curvature R8 of the image-side surface of the fourth lens may satisfy: $1.0<R7/R8<3.0$.

According to an implementation of the present disclosure, radius of curvature R12 of an image-side surface of the sixth lens and a radius of curvature R13 of an object-side surface of the seventh lens may satisfy: $5.5<R12/R13<8.0$.

According to an implementation of the present disclosure, a center thickness CT3 of the third lens on an optical axis and a spacing distance T34 between the third lens and the fourth lens on the optical axis may satisfy: $2.5<T34/CT3<3.5$.

According to an implementation of the present disclosure, a center thickness CT5 of the fifth lens on an optical axis and a spacing distance T56 between the fifth lens and the sixth lens on the optical axis may satisfy: $1.5<T56/CT5<2.0$.

According to an implementation of the present disclosure, a center thickness CT4 of the fourth lens on an optical axis and a spacing distance T45 between the fourth lens and the fifth lens on the optical axis may satisfy: $1.5<T45/CT4<2.1$.

According to an implementation of the present disclosure, a center thickness CT1 of the first lens on an optical axis and a center thickness CT6 of the sixth lens on the optical axis may satisfy: $1.0<CT1/CT6<2.5$.

According to an implementation of the present disclosure, a center thickness CT2 of the second lens on an optical axis and a center thickness CT7 of the seventh lens on the optical axis may satisfy: $2.0<CT2/CT7<3.0$.

According to an implementation of the present disclosure, a maximal field-of-view FOV of the optical imaging system may satisfy: $35°<FOV<45°$.

According to an implementation of the present disclosure, the total effective focal length f of the optical imaging system may satisfy: $f\geq11$ mm.

According to an implementation of the present disclosure, the total effective focal length f of the optical imaging system and an entrance pupil diameter EPD of the optical imaging system may satisfy: $f/EPD<1.7$.

According to the present disclosure, by reasonably distributing the refractive powers and surface types of the lenses and optimizing optical parameters, an optical imaging system applicable to a portable electronic product and having characteristics of miniaturization and good imaging quality is provided.

BRIEF DESCRIPTION OF THE DRAWINGS

After reading detailed descriptions of non-limiting embodiments given with reference to the following accompanying drawings, other features, objectives and advantages of the present disclosure will become more apparent:

FIG. 5 is a schematic structural diagram of an optical imaging system according to Embodiment 3 of the present disclosure;

FIGS. 6A to 6D respectively show a longitudinal aberration curve, an astigmatic curve, a distortion curve and a lateral color curve of the optical imaging system according to Embodiment 3;

DETAILED DESCRIPTION OF EMBODIMENTS

Figure 1:
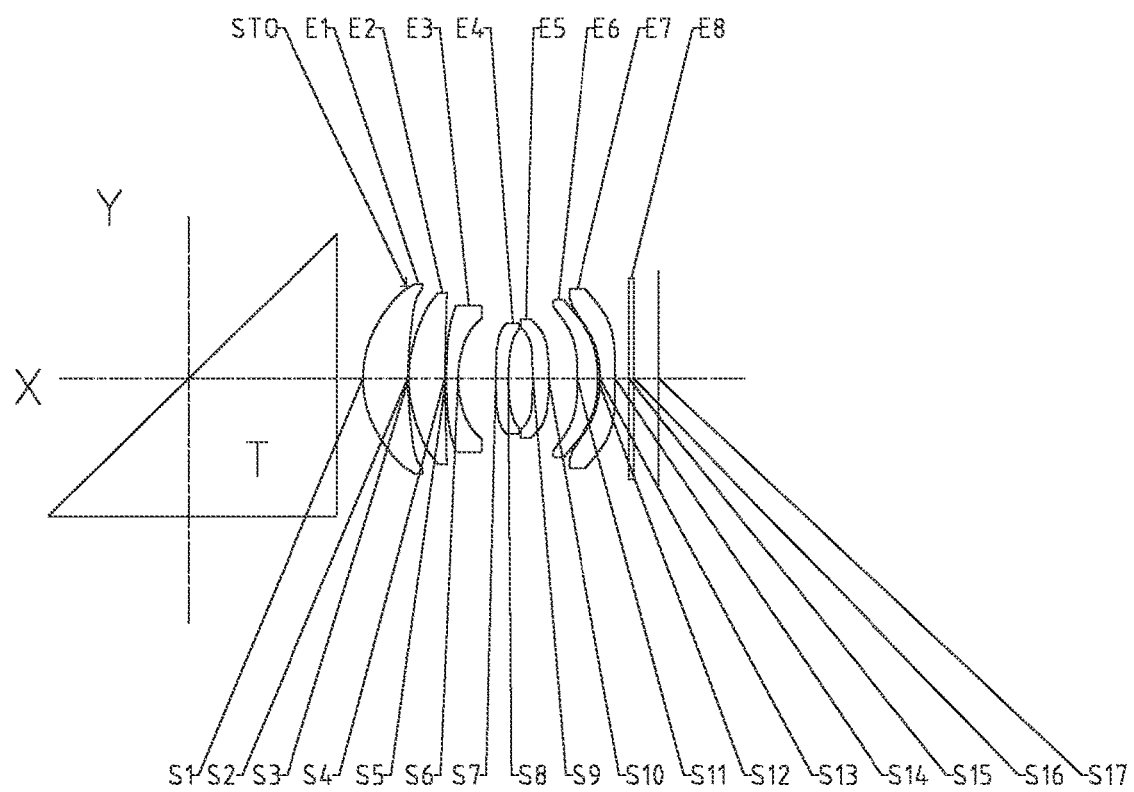
FIG. 1 is a schematic structural diagram of an optical imaging system according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, on the one hand, the thicknesses, sizes and shapes of lenses are slightly exaggerated for the convenience of explanation. Specifically, shapes of spherical surfaces or aspheric surfaces shown in the accompanying drawings are shown by examples. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale. On the other hand, the shape of a prism is slightly exaggerated and simplified simultaneously in the accompanying drawings. Specifically, the shape of the prism shown in the accompanying drawing is shown by an example in a plane. In practical applications, the size and structure of the prism can be specifically designed according to actual conditions.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

An optical imaging system according to exemplary implementations of the present disclosure may include a prism and seven lenses having refractive powers. The seven lenses having the refractive powers are respectively a first lens, a second lens, a third lens, a fourth lens, a fifth lens, a sixth lens and a seventh lens. As shown in FIG. 1, the prism T may reflect light that is incident to the prism T along a first direction Y, to cause the light to emerge from the prism T along a second direction X. Here, the first direction Y may be perpendicular to the second direction X. The seven lenses are arranged sequentially from the prism to an image side along the second direction. Any two adjacent lenses in the first to seventh lenses may have a spacing distance.

In the exemplary implementations, by disposing the prism in the optical imaging system, it is possible that the light deflects at a certain angle after passing through the prism, to adjust the total effective focal length of the optical imaging system, and thus, the zoom multiple of the system can be enhanced.

In the exemplary implementations, the first lens may have a positive refractive power or a negative refractive power. The second lens may have a positive refractive power, and an image-side surface of the second lens may be a concave surface. The third lens may have a negative refractive power. The fourth lens may have a negative refractive power, and an image-side surface of the fourth lens may be a concave surface. The fifth lens may have a positive refractive power. The sixth lens may have a positive refractive power or a negative refractive power. The seventh lens may have a positive refractive power or a negative refractive power.

In the exemplary implementations, the position and surface type of the prism and the refractive powers and surface types of the first to seventh lenses are reasonably set, which is conducive to improving the optical zoom multiple of the optical imaging system, such that the optical imaging system has a good imaging quality.

In the exemplary implementations, the optical imaging system according to the present disclosure may satisfy: $-3.0<f7/f2<-1.0$. Here, f7 is an effective focal length of the seventh lens, and f2 is an effective focal length of the second lens. More specifically, f7 and f2 may further satisfy: $-2.8<f7/f2<-1.2$. Satisfying $-3.0<f7/f2<-1.0$ is conducive to constraining the spherical aberrations of the second lens and the seventh lens within a small range, which is conducive to ensuring the imaging quality of the optical imaging system.

In the exemplary implementations, the optical imaging system according to the present disclosure may satisfy: $-3.5<f4/f<-1.5$. Here, f4 is an effective focal length of the fourth lens, and f is a total effective focal length of the optical imaging system. Satisfying $-3.5<f4/f<-1.5$ is conducive to correcting the axial spherical aberration of the optical imaging system.

In the exemplary implementations, the optical imaging system according to the present disclosure may satisfy: $3.0<R4/f2<5.0$. Here, R4 is a radius of curvature of the image-side surface of the second lens, and f2 is the effective focal length of the second lens. More specifically, R4 and f2 may further satisfy: $3.3<R4/f2<4.9$. Satisfying $3.0<R4/f2<5.0$ is conducive to ensuring the machining and shaping of the second lens, and also helps to reduce the astigmatism on the sagittal plane of the optical imaging system.

In the exemplary implementations, the optical imaging system according to the present disclosure may satisfy: $-3.5<f3/R6<-2.0$. Here, f3 is an effective focal length of the third lens, and R6 is a radius of curvature of an image-side surface of the third lens. More specifically, f3 and R6 may further satisfy: $-3.1<f3/R6<-2.4$. By satisfying $-3.5<f3/R6<-2.0$, the shape of the third lens can be effectively controlled to ensure the processability of the third lens, which is conducive to the shaping and assembling of the system and improving the resolution of the system.

In the exemplary implementations, the optical imaging system according to the present disclosure may satisfy: $1.5<R2/R1<2.5$. Here, R1 is a radius of curvature of an object-side surface of the first lens, and R2 is a radius of curvature of an image-side surface of the first lens. By satisfying $1.5<R2/R1<2.5$, the amount of spherical aberration that the first lens contributes to the system as a whole can be reduced, which is conducive to improving the imaging quality of the optical imaging system.

In the exemplary implementations, the optical imaging system according to the present disclosure may satisfy: $3.5<R4/R5<5.0$. Here, R4 is the radius of curvature of the image-side surface of the second lens, and R5 is a radius of curvature of an object-side surface of the third lens. More specifically, R4 and R5 may further satisfy: $3.7<R4/R5<4.9$. By satisfying $3.5<R4/R5<5.0$, the deflection angle of a light beam at the third lens can be effectively controlled, to ensure that the optical imaging system still has a good imaging quality when the position of the image plane changes.

In the exemplary implementations, the optical imaging system according to the present disclosure may satisfy: $1.0<R7/R8<3.0$. Here, R7 is a radius of curvature of an object-side surface of the fourth lens, and R8 is a radius of curvature of the image-side surface of the fourth lens. More specifically, R7 and R8 may further satisfy: $1.3<R7/R8<3.0$. By satisfying $1.0<R7/R8<3.0$, the amount of spherical aberration that the fourth lens contributes to the optical imaging system as a whole can be reduced, which is conducive to improving the imaging quality of the optical imaging system.

In the exemplary implementations, the optical imaging system according to the present disclosure may satisfy: $5.5<R12/R13<8.0$. Here, R12 is a radius of curvature of an image-side surface of the sixth lens, and R13 is a radius of curvature of an object-side surface of the seventh lens. More specifically, R12 and R13 may further satisfy: $5.5<R12/R13<7.9$. By satisfying $5.5<R12/R13<8.0$, the deflection angle of a light beam at the seventh lens can be effectively controlled, to ensure that the optical imaging system has a good imaging quality when the position of the image plane changes.

In the exemplary implementations, the optical imaging system according to the present disclosure may satisfy: $2.5<T34/CT3<3.5$. Here, CT3 is a center thickness of the third lens on an optical axis, and T34 is a spacing distance between the third lens and the fourth lens on the optical axis. More specifically, T34 and CT3 may further satisfy: $2.6<T34/CT3<3.2$. By satisfying $2.5<T34/CT3<3.5$, the size of the optical imaging system can be effectively reduced, to ensure the miniaturization of the optical imaging system.

In the exemplary implementations, the optical imaging system according to the present disclosure may satisfy: $1.5<T56/CT5<2.0$. Here, CT5 is a center thickness of the fifth lens on the optical axis, and T56 is a spacing distance between the fifth lens and the sixth lens on the optical axis. More specifically, T56 and CT5 may further satisfy: $1.7<T56/CT5<2.0$. By satisfying $1.5<T56/CT5<2.0$, the size of the optical imaging system can be effectively reduced, to ensure the miniaturization of the optical imaging system.

In the exemplary implementations, the optical imaging system according to the present disclosure may satisfy: $1.5<T45/CT4<2.1$. Here, CT4 is a center thickness of the fourth lens on the optical axis, and T45 is a spacing distance between the fourth lens and the fifth lens on the optical axis. By satisfying $1.5<T45/CT4<2.1$, the size of the optical imaging system can be effectively reduced, to ensure the miniaturization of the optical imaging system.

In the exemplary implementations, the optical imaging system according to the present disclosure may satisfy: $1.0<CT1/CT6<2.5$. Here, CT1 is a center thickness of the first lens on the optical axis, and CT6 is a center thickness of the sixth lens on the optical axis. More specifically, CT1 and CT6 may further satisfy: $1.4<CT1/CT6<2.3$. By satisfying $1.0<CT1/CT6<2.5$, the amount of distortion that the first lens and the sixth lens contribute can be controlled within a reasonable range, such that the distortion variation of each field of view of the optical imaging system is within a reasonable range, which is conducive to satisfying the requirement of later software debugging.

In the exemplary implementations, the optical imaging system according to the present disclosure may satisfy: $2.0<CT2/CT7<3.0$. Here, CT2 is a center thickness of the second lens on the optical axis, and CT7 is a center thickness of the seventh lens on the optical axis. More specifically, CT2 and CT7 may further satisfy: 2.1<CT2/CT7<2.9. By satisfying 2.0<CT2/CT7<3.0, the amount of distortion that the second lens and the seventh lens contribute can be controlled within a reasonable range, such that the distortion variation of each field of view of the optical imaging system is within a reasonable range, which is conducive to satisfying the requirement of later software debugging.

In the exemplary implementations, the optical imaging system according to the present disclosure may satisfy: 35°<FOV<45°. Here, FOV is a maximal field-of-view of the optical imaging system. More specifically, FOV may further satisfy: 37°<FOV<41°. Satisfying 35°<FOV<45° is conducive to ensuring the optical zoom multiple of the optical imaging system.

In the exemplary implementations, the optical imaging system according to the present disclosure may satisfy: f≥11 mm. Here, f is the total effective focal length of the optical imaging system. Satisfying f≥11 mm is conducive to ensuring the optical zoom multiple of the optical imaging system.

In the exemplary implementations, the optical imaging system according to the present disclosure may satisfy: f/EPD<1.7. Here, f is the total effective focal length of the optical imaging system, and EPD is an entrance pupil diameter of the optical imaging system. Satisfying f/EPD<1.7 is conducive to ensuring the light flux of the optical imaging system, and improving the signal-to-noise ratio of the system.

In the exemplary implementations, the optical imaging system according to the present disclosure may further include a diaphragm disposed between the prism and the first lens. Alternatively, the above optical imaging system may further include an optical filter for correcting color deviations and/or a protective glass for protecting a photosensitive element on the image plane. The present disclosure proposes an optical imaging system having characteristics such as miniaturization, telephoto and high imaging quality. The optical imaging system according to the above implementations of the present disclosure may use a plurality of lenses, for example, the above seven lenses. By reasonably designing the prism and reasonably distributing the refractive powers and the surface types of the lenses, the center thicknesses of the lenses, the axial spacings between the lenses, etc., it is possible to effectively converge the incident light, reduce the total track length of an imaging lens assembly, and improve the processability of the imaging lens assembly, which is more conducive to the production and processing of the optical imaging system.

In the implementations of the present disclosure, at least one of the surfaces of the lenses is an aspheric surface. That is, at least one of the surfaces from the object-side surface of the first lens to the image-side surface of the seventh lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens and the seventh lens is an aspheric surface. Alternatively, both the object-side surface and the image-side surface of each of the first lens, the second lens, the third lens, the fourth lens, the fifth lens, the sixth lens and the seventh lens are aspheric surfaces.

However, it should be understood by those skilled in the art that the various results and advantages described in the present specification may be obtained by changing the number of the lenses constituting the optical imaging system without departing from the technical solution claimed by the present disclosure. For example, although the optical imaging system having seven lenses is described as an example in the implementations, the optical imaging system is not limited to the seven lenses. If desired, the optical imaging system may also include other numbers of lenses.

Specific embodiments of the optical imaging system that may be applied to the above implementations are further described below with reference to the accompanying drawings.

Embodiment 1

An optical imaging system according to Embodiment 1 of the present disclosure is described below with reference to FIGS. 1 to 2D. FIG. 1 is a schematic structural diagram of the optical imaging system according to Embodiment 1 of the present disclosure.

As shown in FIG. 1, the optical imaging system includes, sequentially from an object side to an image side along a second direction, a prism T, a diaphragm STO, a first lens E1, a second lens E2, a third lens E3, a fourth lens E4, a fifth lens E5, a sixth lens E6, a seventh lens E7, an optical filter E8 and an image plane S17.

The prism T has a light incident surface, a light reflection surface and a light emergent surface. The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 as a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces from the light incident surface of the prism T to the image-side surface S16 of the optical filter E8, and finally forms an image on the image plane S17.

Table 1 is a table showing basic parameters of the optical imaging system in Embodiment 1. Here, the units of a radius of curvature, a thickness/distance and a focal length are millimeters (mm).

TABLE 1

| surface number | surface type | radius of curvature | thickness/ distance | material refractive index | abbe number | focal length | conic coefficient |
|---|---|---|---|---|---|---|---|
| OBJ | spherical | infinite | infinite | | | | |
| | spherical | infinite | −3.4000 | 1.91 | 31.3 | | |
| | spherical | infinite | 3.4000 | | | | |
| | spherical | infinite | 0.0000 | | | | |
| | spherical | infinite | 1.9559 | | | | |
| STO | spherical | infinite | −1.9559 | | | | |
| S1 | aspheric | 4.1760 | 1.7426 | 1.55 | 55.8 | 11.64 | −0.3466 |
| S2 | aspheric | 10.3842 | 0.0400 | | | | 1.2698 |
| S3 | aspheric | 5.2747 | 1.4000 | 1.55 | 55.8 | 10.65 | 0.2359 |
| S4 | aspheric | 51.3099 | 0.0400 | | | | 90.0000 |
| S5 | aspheric | 10.6438 | 0.4700 | 1.68 | 19.2 | −9.86 | 7.3767 |
| S6 | aspheric | 4.0314 | 1.4680 | | | | 0.7962 |
| S7 | aspheric | 27.8615 | 0.4800 | 1.55 | 55.8 | −26.46 | 27.0009 |
| S8 | aspheric | 9.4544 | 0.9525 | | | | 11.8415 |
| S9 | aspheric | 80.0000 | 0.6123 | 1.68 | 19.2 | 1386.19 | 16.3104 |
| S10 | aspheric | 87.1785 | 1.1124 | | | | 35.0821 |
| S11 | aspheric | −100.0000 | 0.8153 | 1.64 | 23.5 | −842.07 | 39.0000 |
| S12 | aspheric | −122.9761 | 0.0917 | | | | −99.0000 |
| S13 | aspheric | −22.3001 | 0.5800 | 1.55 | 55.8 | −28.83 | 46.3954 |
| S14 | aspheric | 54.0117 | 0.5310 | | | | 29.2046 |
| S15 | spherical | infinite | 0.2100 | 1.52 | 64.2 | | |
| S16 | spherical | infinite | 0.9541 | | | | |
| S17 | spherical | infinite | | | | | |

In this example, a total effective focal length f of the optical imaging system is 12.00 mm, and a distance TTL from the object-side surface S1 of the first lens E1 to the image plane S17 of the optical imaging system on an optical axis is 11.50 mm. Half of a diagonal length ImgH of an effective pixel area on the image plane S17 of the optical imaging system is 4.20 mm. Half of a maximal field-of-view Semi-FOV of the optical imaging system is 19.1°.

In Embodiment 1, both the object-side surface and the image-side surface of any lens in the first to seventh lenses E1 to E7 are aspheric surfaces, and the surface type x of each aspheric lens may be defined using, but not limited to, the following formula:

$$x = \frac{ch^2}{1+\sqrt{1-(k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Table 2 below shows the high-order coefficients $A_4$, $A_6$, $A_8$, $A_{10}$, $A_{12}$, $A_{14}$, $A_{16}$, $A_{18}$ and Am applicable to the aspheric surfaces S1 to S14 in Embodiment 1.

TABLE 2

| surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | −4.1103E−02 | 2.8505E−02 | 2.4812E−02 | 1.0265E−02 | 2.3836E−03 | 9.2157E−05 | −2.7338E−04 | −1.6501E−04 | −6.2655E−05 |
| S2 | −2.2011E−01 | 1.1373E−01 | 1.6252E−02 | −7.4960E−04 | −1.0833E−04 | −1.7188E−03 | −5.3003E−04 | 3.7718E−05 | −5.1368E−05 |
| S3 | −1.4278E−01 | 2.9309E−02 | 1.3360E−02 | −4.2720E−03 | −8.7012E−04 | −1.4974E−03 | −7.6484E−04 | 4.6556E−05 | 4.3996E−05 |
| S4 | −4.0539E−02 | 5.5261E−05 | 4.9112E−03 | 3.8471E−03 | −5.7002E−03 | 2.1723E−03 | −8.6307E−04 | 5.9802E−04 | −2.2036E−04 |
| S5 | −1.2325E−01 | 5.7887E−02 | −2.5652E−02 | 1.0398E−02 | −5.9479E−03 | 1.4077E−03 | −4.3063E−04 | 2.9442E−04 | −1.2116E−04 |
| S6 | 3.3049E−02 | 5.2373E−02 | −1.1874E−02 | 9.5701E−04 | −1.5947E−03 | −4.7911E−04 | −1.7484E−04 | −2.4954E−05 | −3.8097E−06 |
| S7 | 2.5291E−01 | 3.4012E−02 | −7.0172E−04 | 2.0830E−03 | 7.9575E−05 | −3.3903E−05 | −2.4595E−05 | −3.8577E−05 | −2.3967E−06 |
| S8 | 1.3883E−01 | 2.5321E−02 | −1.3157E−03 | 1.9104E−03 | 4.6033E−04 | 2.5967E−04 | 1.0113E−04 | 5.6015E−05 | 2.0851E−05 |
| S9 | −4.2934E−01 | −2.0607E−02 | −1.3829E−02 | −1.0859E−03 | 1.1543E−04 | 6.3651E−04 | 3.5755E−04 | 2.5749E−04 | 1.1776E−04 |
| S10 | −6.7581E−01 | 8.7759E−03 | −1.1102E−02 | 5.5677E−03 | 2.6946E−03 | 1.9808E−03 | 7.2250E−04 | 4.1222E−04 | 1.0888E−04 |
| S11 | −1.0584E+00 | 1.4623E−01 | −9.4261E−03 | 2.3269E−02 | 7.9026E−03 | 1.8998E−03 | −2.7549E−03 | −4.8320E−04 | −7.7034E−04 |
| S12 | −1.5762E+00 | 3.3694E−01 | −9.2501E−02 | 5.5125E−02 | −1.8006E−02 | 1.7241E−02 | −1.1030E−02 | 6.6592E−03 | −5.2321E−03 |
| S13 | −1.2710E+00 | 5.0187E−01 | −8.4204E−02 | 5.6141E−02 | −4.0280E−02 | 2.1534E−02 | −1.4020E−02 | 9.9028E−03 | −7.4867E−03 |
| S14 | −1.4349E+00 | 1.5489E−01 | −3.2682E−03 | 1.4899E−02 | −6.1476E−03 | 1.1811E−03 | −4.1302E−03 | 8.1083E−05 | −2.2727E−03 |

Figures 2A, 2B:
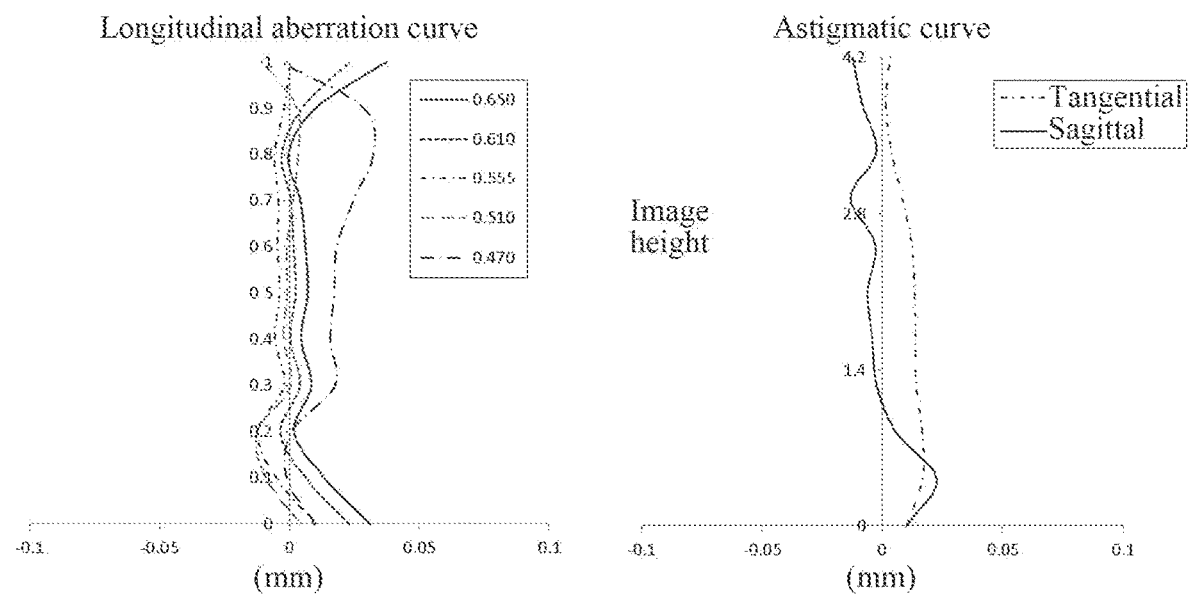
FIGS. 2A to 2D respectively show a longitudinal aberration curve, an astigmatic curve, a distortion curve and a lateral color curve of the optical imaging system according to Embodiment 1.
Figure 2C:
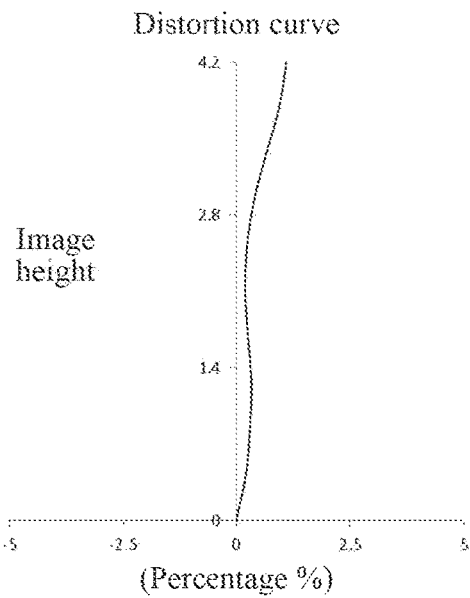
Figure 2D:
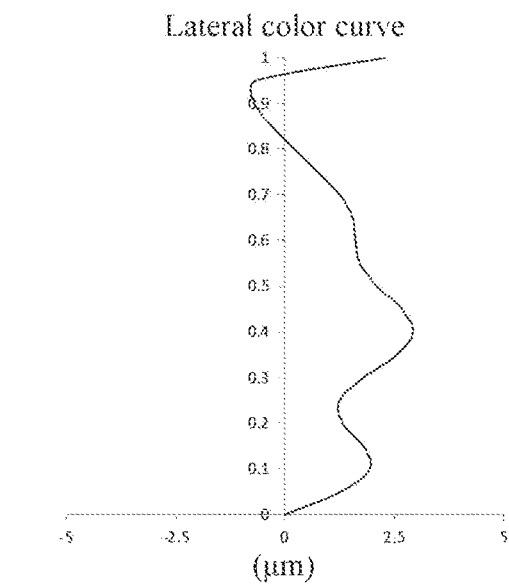

FIG. 2A illustrates a longitudinal aberration curve of the optical imaging system in Embodiment 1, representing deviations of focal points of light of different wavelengths converged after passing through a lens assembly. FIG. 2B illustrates an astigmatic curve of the optical imaging system in Embodiment 1, representing a curvature of a tangential image plane and a curvature of a sagittal image plane. FIG. 2C illustrates a distortion curve of the optical imaging system in Embodiment 1, representing amounts of distortion corresponding to different image heights. FIG. 2D illustrates a lateral color curve of the optical imaging system in Embodiment 1, representing deviations of different image heights on the image plane after light passes through the lens assembly. It can be seen from FIGS. 2A to 2D that the optical imaging system given in Embodiment 1 can achieve a good imaging quality.

Embodiment 2

Figure 3:
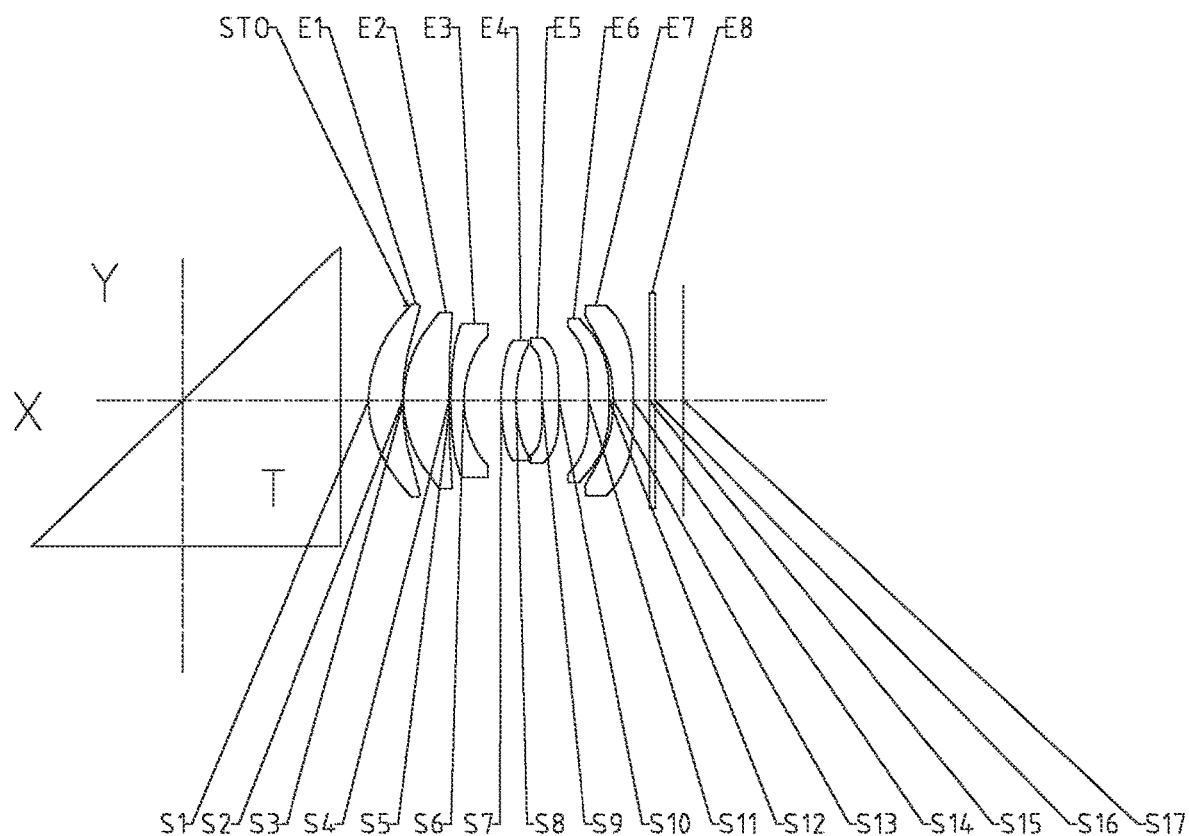
FIG. 3 is a schematic structural diagram of an optical imaging system according to Embodiment 2 of the present disclosure.

An optical imaging system according to Embodiment 2 of the present disclosure is described below with reference to FIGS. 3 to 4D. In this embodiment and the following embodiments, for the sake of brevity, some descriptions similar to those in Embodiment 1 will be omitted. FIG. 3 is a schematic structural diagram of the optical imaging system according to Embodiment 2 of the present disclosure.

As shown in FIG. 3, the optical imaging system includes, sequentially from an object side to an image side, a prism T, a diaphragm STO, a first lens E1, a second lens E2, a third lens E3, a fourth lens E4, a fifth lens E5, a sixth lens E6, a seventh lens E7, an optical filter E8 and an image plane S17.

The prism T has a light incident surface, a light reflection surface and a light emergent surface. The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces from the light incident surface of the prism T to the image-side surface S16 of the optical filter E8, and finally forms an image on the image plane S17.

In this example, a total effective focal length f of the optical imaging system is 11.39 mm, and a distance TTL from the object-side surface S1 of the first lens E1 to the image plane S17 of the optical imaging system on an optical axis is 11.41 mm. Half of a diagonal length ImgH of an effective pixel area on the image plane S17 of the optical imaging system is 4.20 mm. Half of a maximal field-of-view Semi-FOV of the optical imaging system is 20.0°.

Table 3 is a table showing basic parameters of the optical imaging system in Embodiment 2. Here, the units of a radius of curvature, a thickness/distance and a focal length are millimeters (mm). Table 4 shows the high-order coefficients applicable to the aspheric surfaces in Embodiment 2. Here, the surface type of each aspheric surface may be defined using the formula (1) given in Embodiment 1.

TABLE 3

| surface number | surface type | radius of curvature | thickness/ distance | material refractive index | abbe number | focal length | conic coefficient |
|---|---|---|---|---|---|---|---|
| OBJ | spherical | infinite | infinite | | | | |
| | spherical | infinite | −3.4000 | 1.91 | 31.3 | | |
| | spherical | infinite | 3.4000 | | | | |
| | spherical | infinite | 0.0000 | | | | |
| | spherical | infinite | 1.5117 | | | | |
| STO | spherical | infinite | −1.5117 | | | | |
| S1 | aspheric | 4.4818 | 1.2235 | 1.55 | 55.8 | 18.21 | −0.4054 |
| S2 | aspheric | 7.3754 | 0.0400 | | | | 0.0249 |
| S3 | aspheric | 4.3007 | 1.6578 | 1.55 | 55.8 | 8.66 | 0.0224 |
| S4 | aspheric | 41.1836 | 0.0400 | | | | 78.2017 |
| S5 | aspheric | 8.6362 | 0.4794 | 1.68 | 19.2 | −10.24 | 4.2106 |
| S6 | aspheric | 3.7616 | 1.3481 | | | | 0.2975 |
| S7 | aspheric | 7.0199 | 0.5449 | 1.55 | 55.8 | −33.35 | 0.9193 |
| S8 | aspheric | 4.9276 | 0.9338 | | | | 0.6484 |
| S9 | aspheric | 45.6591 | 0.6120 | 1.68 | 19.2 | 49.77 | −99.0000 |
| S10 | aspheric | −128.3011 | 1.1068 | | | | 78.6140 |
| S11 | aspheric | 268.2538 | 0.7412 | 1.64 | 23.5 | 155.13 | 39.0000 |
| S12 | aspheric | −159.2525 | 0.1448 | | | | 90.0000 |
| S13 | aspheric | −21.9477 | 0.7129 | 1.55 | 55.8 | −21.83 | 46.3954 |
| S14 | aspheric | 26.3842 | 0.5963 | | | | 24.9053 |
| S15 | spherical | infinite | 0.2100 | 1.52 | 64.2 | | |
| S16 | spherical | infinite | 1.0152 | | | | |
| S17 | spherical | infinite | | | | | |

TABLE 4

| surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | −5.3449E−03 | −2.8726E−02 | −9.2569E−03 | −2.7064E−03 | −2.5506E−04 | 2.6017E−04 | 1.0363E−04 | −1.9876E−05 | 6.0352E−06 |
| S2 | −2.4602E−01 | −4.3601E−03 | −1.1411E−02 | 2.9794E−03 | −7.0751E−04 | 6.5043E−04 | −9.7714E−04 | 1.6319E−05 | −2.5650E−05 |
| S3 | −1.6841E−01 | −1.0470E−02 | −1.5876E−02 | 1.6335E−03 | 2.5117E−04 | 1.2077E−03 | −7.2771E−04 | −3.5076E−04 | −2.4993E−05 |
| S4 | −4.3178E−02 | 2.2592E−02 | −1.9268E−02 | 8.1269E−03 | −3.9936E−03 | 2.1327E−03 | −1.5728E−03 | 9.2284E−04 | −3.1160E−04 |
| S5 | −2.1628E−01 | 6.2231E−02 | −1.9065E−02 | 5.0292E−03 | −4.3688E−03 | 1.4943E−03 | −9.0221E−04 | 5.1462E−04 | −7.6445E−05 |
| S6 | −4.7927E−02 | 3.8783E−02 | −4.8419E−04 | −4.9169E−04 | −9.5897E−04 | −1.9268E−04 | −7.6935E−05 | 2.5414E−05 | 3.9916E−05 |
| S7 | −6.4164E−04 | 3.7018E−02 | 4.3586E−03 | 4.5208E−04 | 5.9635E−05 | 2.0511E−05 | 4.8100E−06 | 3.7813E−06 | 3.7130E−06 |
| S8 | −4.0482E−02 | 2.4198E−02 | 3.6057E−03 | 8.9367E−04 | 2.1991E−04 | 9.3148E−05 | 1.8147E−05 | 1.1818E−05 | 3.3736E−06 |
| S9 | −3.5028E−01 | −2.4349E−02 | −3.8725E−03 | −3.1572E−04 | −1.3438E−04 | 1.1582E−04 | 7.7100E−06 | 3.4931E−05 | 7.1310E−07 |
| S10 | −4.4132E−01 | −7.8978E−03 | −4.8854E−04 | 7.4647E−04 | 4.1747E−05 | 2.5026E−04 | −3.4796E−06 | 4.2139E−05 | −7.4255E−06 |
| S11 | −8.4103E−01 | 4.2684E−02 | 1.5788E−02 | 7.7859E−03 | 6.2453E−04 | 2.4670E−03 | −4.8082E−04 | 7.7286E−06 | −2.0040E−04 |
| S12 | −1.2004E+00 | 1.5859E−01 | −3.6604E−02 | 3.3399E−02 | −8.5996E−03 | 1.0227E−02 | −2.9154E−03 | 1.1336E−03 | 7.1436E−05 |
| S13 | −9.1962E−01 | 3.0134E−01 | −7.0868E−02 | 5.2097E−02 | −1.8576E−02 | 1.1259E−02 | −4.9723E−03 | 2.1851E−03 | −1.2137E−04 |
| S14 | −1.4781E+00 | 1.2689E−01 | −2.4959E−02 | 2.6237E−02 | −3.8094E−03 | 5.8941E−03 | 1.4730E−03 | 2.9685E−03 | 1.9444E−03 |

Figure 4A:
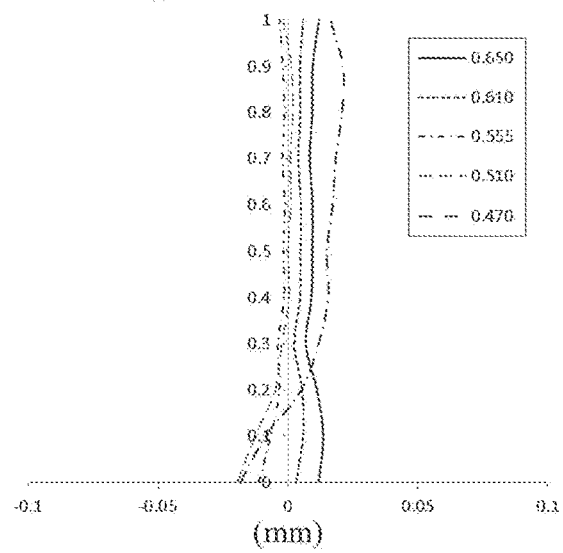
FIGS. 4A to 4D respectively show a longitudinal aberration curve, an astigmatic curve, a distortion curve and a lateral color curve of the optical imaging system according to Embodiment 2.
Figure 4B:
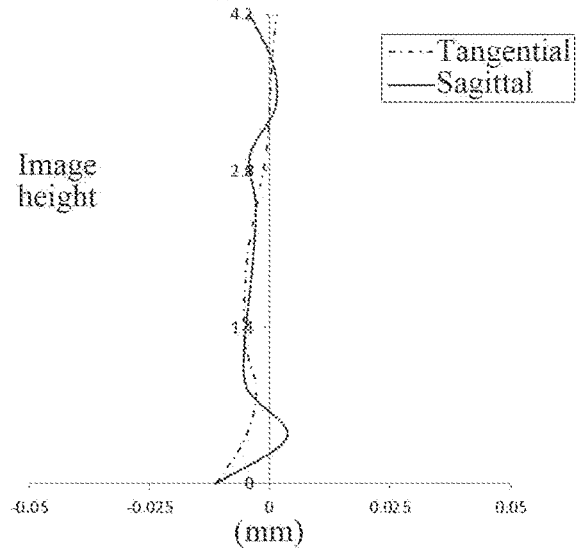
Figure 4C:
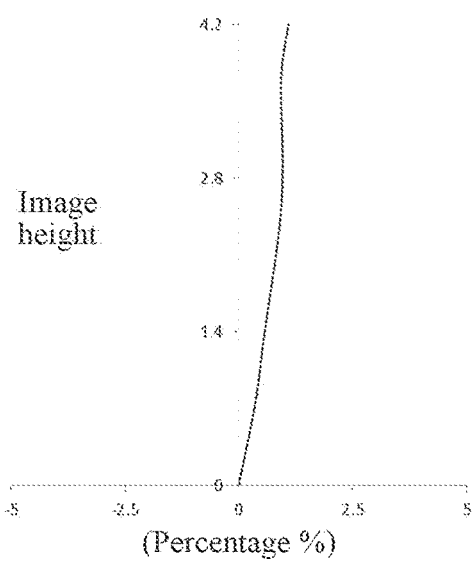
Figure 4D:
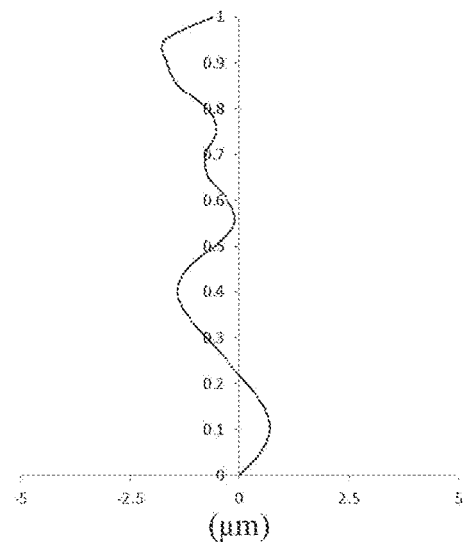

FIG. 4A illustrates a longitudinal aberration curve of the optical imaging system in Embodiment 2, representing deviations of focal points of light of different wavelengths converged after passing through a lens assembly. FIG. 4B illustrates an astigmatic curve of the optical imaging system in Embodiment 2, representing a curvature of a tangential image plane and a curvature of a sagittal image plane. FIG. 4C illustrates a distortion curve of the optical imaging system in Embodiment 2, representing amounts of distortion corresponding to different image heights. FIG. 4D illustrates a lateral color curve of the optical imaging system in Embodiment 2, representing deviations of different image heights on the image plane after light passes through the lens assembly. It can be seen from FIGS. 4A to 4D that the optical imaging system given in Embodiment 2 can achieve a good imaging quality.

Embodiment 3

An optical imaging system according to Embodiment 3 of the present disclosure is described below with reference to FIGS. 5 to 6D. FIG. 5 is a schematic structural diagram of the optical imaging system according to Embodiment 3 of the present disclosure.

As shown in FIG. 5, the optical imaging system includes, sequentially from an object side to an image side, a prism T, a diaphragm STO, a first lens E1, a second lens E2, a third lens E3, a fourth lens E4, a fifth lens E5, a sixth lens E6, a seventh lens E7, an optical filter E8 and an image plane S17.

The prism T has a light incident surface, a light reflection surface and a light emergent surface. The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a concave surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces from the light incident surface of the prism T to the image-side surface S16 of the optical filter E8, and finally forms an image on the image plane S17.

In this example, a total effective focal length f of the optical imaging system is 11.19 mm, and a distance TTL from the object-side surface S1 of the first lens E1 to the image plane S17 of the optical imaging system on an optical axis is 11.32 mm. Half of a diagonal length ImgH of an effective pixel area on the image plane S17 of the optical imaging system is 4.20 mm. Half of a maximal field-of-view Semi-FOV of the optical imaging system is 20.4°.

Table 5 is a table showing basic parameters of the optical imaging system in Embodiment 3. Here, the units of a radius of curvature, a thickness/distance and a focal length are millimeters (mm). Table 6 shows the high-order coefficients applicable to the aspheric surfaces in Embodiment 3. Here, the surface type of each aspheric surface may be defined using the formula (1) given in Embodiment 1.

TABLE 5

| surface number | surface type | radius of curvature | thickness/ distance | refractive index | abbe number | focal length | conic coefficient |
|---|---|---|---|---|---|---|---|
| OBJ | spherical | infinite | infinite | | | | |
| | spherical | infinite | −3.4000 | 1.91 | 31.3 | | |
| | spherical | infinite | 3.4000 | | | | |
| | spherical | infinite | 0.0000 | | | | |
| | spherical | infinite | 1.4288 | | | | |

TABLE 5-continued

| surface number | surface type | radius of curvature | thickness/ distance | material refractive index | abbe number | focal length | conic coefficient |
|---|---|---|---|---|---|---|---|
| STO | spherical | infinite | −1.4288 | | | | |
| S1 | aspheric | 4.4847 | 1.2017 | 1.55 | 55.8 | 18.06 | −0.4102 |
| S2 | aspheric | 7.4495 | 0.0400 | | | | 0.0444 |
| S3 | aspheric | 4.3181 | 1.6485 | 1.55 | 55.8 | 8.72 | 0.0174 |
| S4 | aspheric | 40.3057 | 0.0400 | | | | 74.9826 |
| S5 | aspheric | 8.5462 | 0.4838 | 1.68 | 19.2 | −10.23 | 4.2639 |
| S6 | aspheric | 3.7393 | 1.3212 | | | | 0.3003 |
| S7 | aspheric | 7.1588 | 0.5711 | 1.55 | 55.8 | −37.80 | 1.0183 |
| S8 | aspheric | 5.1652 | 0.9104 | | | | 0.4727 |
| S9 | aspheric | 22.3115 | 0.6301 | 1.68 | 19.2 | 45.39 | −14.3122 |
| S10 | aspheric | 80.3548 | 1.1056 | | | | 90.0000 |
| S11 | aspheric | −212.9547 | 0.8149 | 1.64 | 23.5 | 973.90 | 39.0000 |
| S12 | aspheric | −159.2513 | 0.1326 | | | | 89.9572 |
| S13 | aspheric | −22.0025 | 0.7453 | 1.55 | 55.8 | −21.50 | 46.3954 |
| S14 | aspheric | 25.4503 | 0.5241 | | | | 25.6647 |
| S15 | spherical | infinite | 0.2100 | 1.52 | 64.2 | | |
| S16 | spherical | infinite | 0.9433 | | | | |
| S17 | spherical | infinite | | | | | |

TABLE 6

| surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | −7.6539E−03 | −2.8512E−02 | −1.0209E−02 | −2.8829E−03 | −1.4810E−04 | 3.6841E−04 | 1.4597E−04 | −1.8195E−05 | −6.6832E−06 |
| S2 | −2.4476E−01 | −3.5010E−03 | −1.2391E−02 | 3.1270E−03 | −1.1730E−03 | 5.1000E−04 | −1.1796E−03 | −3.3081E−06 | −7.1383E−05 |
| S3 | −1.7059E−01 | −1.1721E−02 | −1.3931E−02 | 3.0443E−03 | 6.5049E−05 | 9.0690E−04 | −1.0451E−03 | −4.6187E−04 | −1.1510E−04 |
| S4 | −4.3654E−02 | 2.0175E−02 | −1.7383E−02 | 7.5788E−03 | −4.3812E−03 | 2.0392E−03 | −1.6707E−03 | 9.2868E−04 | −3.6510E−04 |
| S5 | −2.1366E−01 | 6.1297E−02 | −2.0253E−02 | 4.7023E−03 | −3.7460E−03 | 1.6687E−03 | −8.7248E−04 | 6.1353E−04 | −9.4840E−05 |
| S6 | −4.7827E−02 | 3.9427E−02 | −9.5187E−04 | −4.1331E−04 | −1.0010E−03 | −1.6249E−04 | −6.4258E−05 | 3.5737E−05 | 3.6740E−05 |
| S7 | 5.3919E−04 | 3.6398E−02 | 4.5446E−03 | 5.6281E−04 | 5.0232E−05 | 2.2440E−05 | 8.9983E−06 | 3.8419E−06 | 3.8015E−06 |
| S8 | −4.3179E−02 | 2.3144E−02 | 3.4372E−03 | 9.0775E−04 | 1.8882E−04 | 7.6200E−05 | 1.2804E−05 | 8.8958E−06 | 2.4736E−06 |
| S9 | −3.4631E−01 | −2.4239E−02 | −3.6106E−03 | −1.9687E−04 | −1.4192E−04 | 6.2168E−05 | −1.4717E−05 | 1.8681E−05 | −5.0428E−06 |
| S10 | −4.3967E−01 | −8.3810E−03 | 1.4536E−05 | 8.4060E−04 | −1.5520E−05 | 1.7853E−04 | −1.3670E−05 | 3.2597E−05 | −6.8261E−06 |
| S11 | −8.3438E−01 | 4.6865E−02 | 1.7202E−02 | 6.4438E−03 | 3.4417E−05 | 2.1241E−03 | −1.8974E−04 | 8.1996E−05 | −2.2336E−04 |
| S12 | −1.2173E+00 | 1.6505E−01 | −4.2099E−02 | 2.9050E−02 | −1.0422E−02 | 9.4767E−03 | −2.7835E−03 | 1.7634E−03 | −2.1796E−04 |
| S13 | −9.1729E−01 | 2.9653E−01 | −7.3680E−02 | 4.8816E−02 | −1.8110E−02 | 1.1656E−02 | −4.4083E−03 | 3.1693E−03 | −3.5393E−04 |
| S14 | −1.4368E+00 | 1.1575E−01 | −2.3436E−02 | 2.2495E−02 | −3.0245E−03 | 6.0496E−03 | 2.3616E−03 | 3.6880E−03 | 2.2615E−03 |

Figures 6C, 6D:
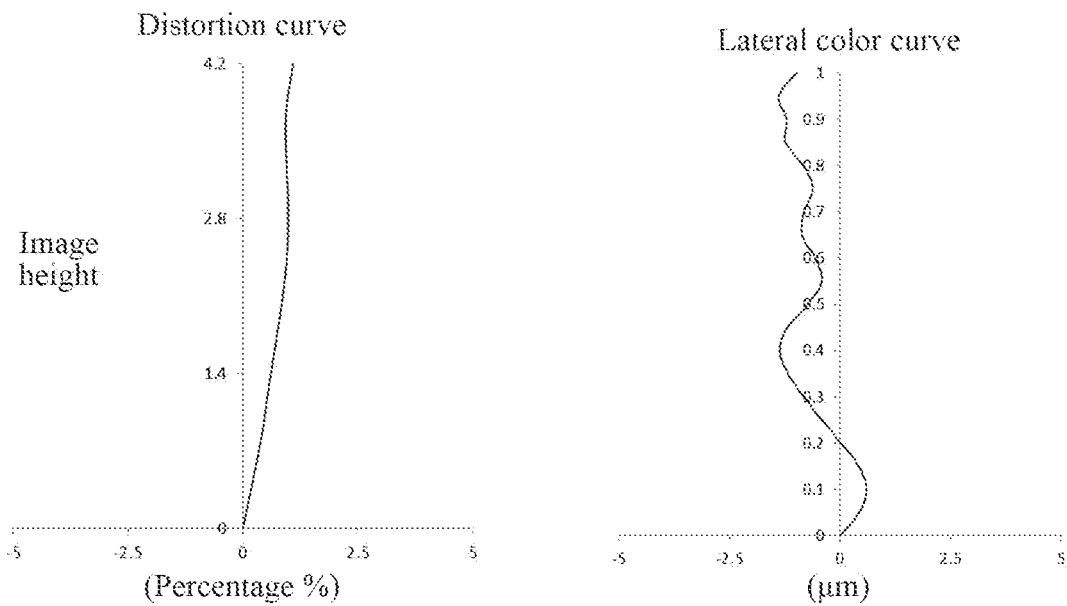

FIG. 6A illustrates a longitudinal aberration curve of the optical imaging system in Embodiment 3, representing deviations of focal points of light of different wavelengths converged after passing through a lens assembly. FIG. 6B illustrates an astigmatic curve of the optical imaging system in Embodiment 3, representing a curvature of a tangential image plane and a curvature of a sagittal image plane. FIG. 6C illustrates a distortion curve of the optical imaging system in Embodiment 3, representing amounts of distortion corresponding to different image heights. FIG. 6D illustrates a lateral color curve of the optical imaging system in Embodiment 3, representing deviations of different image heights on the image plane after light passes through the lens assembly. It can be seen from FIGS. 6A to 6D that the optical imaging system given in Embodiment 3 can achieve a good imaging quality.

Embodiment 4

Figure 7:
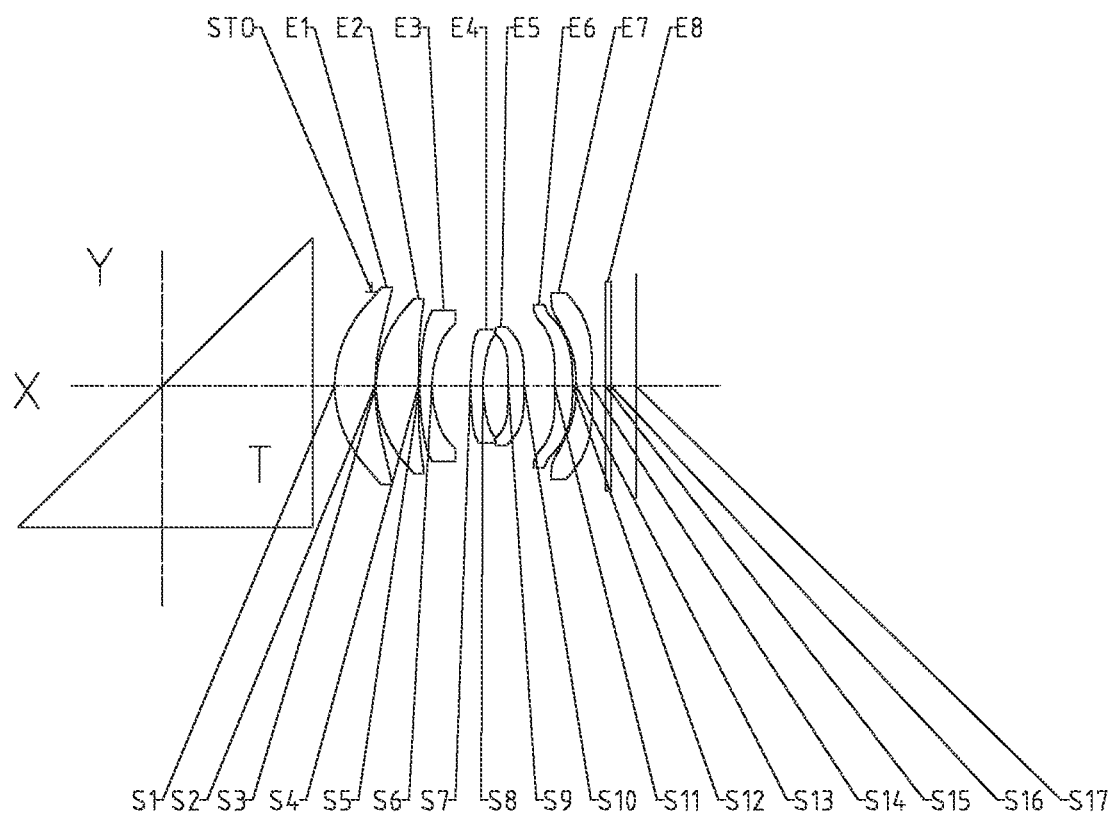
FIG. 7 is a schematic structural diagram of an optical imaging system according to Embodiment 4 of the present disclosure.

An optical imaging system according to Embodiment 4 of the present disclosure is described below with reference to FIGS. 7 to 8D. FIG. 7 is a schematic structural diagram of the optical imaging system according to Embodiment 4 of the present disclosure.

As shown in FIG. 7, the optical imaging system includes, sequentially from an object side to an image side, a prism T, a diaphragm STO, a first lens E1, a second lens E2, a third lens E3, a fourth lens E4, a fifth lens E5, a sixth lens E6, a seventh lens E7, an optical filter E8 and an image plane S17.

The prism T has a light incident surface, a light reflection surface and a light emergent surface. The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a positive refractive power, an object-side surface S11 of the sixth lens E6 is a convex surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces from the light incident surface of the prism T to the image-side surface S16 of the optical filter E8, and finally forms an image on the image plane S17.

In this example, a total effective focal length f of the optical imaging system is 12.12 mm, and a distance TTL from the object-side surface S1 of the first lens E1 to the image plane S17 of the optical imaging system on an optical axis is 11.50 mm. Half of a diagonal length ImgH of an effective pixel area on the image plane S17 of the optical imaging system is 4.20 mm. Half of a maximal field-of-view Semi-FOV of the optical imaging system is 18.9°.

Table 7 is a table showing basic parameters of the optical imaging system in Embodiment 4. Here, the units of a radius of curvature, a thickness/distance and a focal length are millimeters (mm). Table 8 shows the high-order coefficients applicable to the aspheric surfaces in Embodiment 4. Here, the surface type of each aspheric surface may be defined using the formula (1) given in Embodiment 1.

TABLE 7

| surface number | surface type | radius of curvature | thickness/ distance | material refractive index | abbe number | focal length | conic coefficient |
|---|---|---|---|---|---|---|---|
| OBJ | spherical | infinite | infinite | | | | |
| | spherical | infinite | −3.4000 | 1.91 | 31.3 | | |
| | spherical | infinite | 3.4000 | | | | |
| | spherical | infinite | 0.0000 | | | | |
| | spherical | infinite | 1.7657 | | | | |
| STO | spherical | infinite | −1.7657 | | | | |
| S1 | aspheric | 4.4491 | 1.5384 | 1.55 | 55.8 | 17.09 | −0.3639 |
| S2 | aspheric | 7.4670 | 0.0400 | | | | −0.0770 |
| S3 | aspheric | 4.2902 | 1.6227 | 1.55 | 55.8 | 8.95 | 0.0450 |
| S4 | aspheric | 30.6008 | 0.0400 | | | | 79.3351 |
| S5 | aspheric | 8.1408 | 0.4700 | 1.68 | 19.2 | −11.89 | 4.1895 |
| S6 | aspheric | 3.9542 | 1.4686 | | | | 0.4324 |
| S7 | aspheric | 10.6999 | 0.4800 | 1.55 | 55.8 | −18.86 | 4.0364 |
| S8 | aspheric | 5.1635 | 0.9721 | | | | 1.6815 |
| S9 | aspheric | −49.2209 | 0.6025 | 1.68 | 19.2 | 100.00 | 90.0000 |
| S10 | aspheric | −28.6506 | 1.1586 | | | | 86.8409 |
| S11 | aspheric | 23.9183 | 0.6942 | 1.64 | 23.5 | 32.80 | 39.0000 |
| S12 | aspheric | −180.0000 | 0.1330 | | | | 90.0000 |
| S13 | aspheric | −23.1132 | 0.5800 | 1.55 | 55.8 | −11.59 | 46.3954 |
| S14 | aspheric | 8.7933 | 0.5352 | | | | 4.0050 |
| S15 | spherical | infinite | 0.2100 | 1.52 | 64.2 | | |
| S16 | spherical | infinite | 0.9547 | | | | |
| S17 | spherical | infinite | | | | | |

TABLE 8

| surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | 4.2485E−03 | −2.4369E−02 | −6.3453E−03 | −1.3129E−03 | −5.3144E−04 | −2.2352E−04 | −3.5603E−04 | −2.9745E−04 | −7.0606E−05 |
| S2 | −2.6458E−01 | −3.7007E−03 | −8.0519E−03 | 2.8751E−03 | −1.2553E−03 | 1.0028E−06 | −1.1730E−03 | 1.1803E−04 | 3.9844E−04 |
| S3 | −1.5505E−01 | −9.3279E−03 | −1.9608E−02 | −8.9668E−04 | 3.2647E−04 | 8.6246E−04 | −1.0608E−03 | −5.3077E−04 | 5.5139E−04 |
| S4 | −4.0729E−02 | 1.8018E−02 | −2.4257E−02 | 8.3083E−03 | −3.7486E−03 | 1.9677E−03 | −1.6919E−03 | 9.4247E−04 | −9.8111E−05 |
| S5 | −2.1971E−01 | 6.6275E−02 | −1.7783E−02 | 4.6664E−03 | −3.6698E−03 | 1.6047E−03 | −1.0012E−03 | 3.9741E−04 | 4.1453E−05 |
| S6 | −2.8044E−02 | 4.9418E−02 | 3.3588E−03 | −3.9058E−04 | −1.6686E−03 | −4.2208E−04 | −2.6335E−04 | −5.7814E−05 | −1.1433E−05 |
| S7 | 2.5413E−02 | 3.8235E−02 | 3.7610E−03 | 1.6421E−03 | −7.5962E−05 | 3.1828E−04 | −4.4450E−05 | 7.0675E−05 | −1.8009E−05 |
| S8 | −1.2619E−02 | 2.2295E−02 | 2.1164E−03 | 2.5069E−03 | 8.9036E−04 | 9.3489E−04 | 4.7182E−04 | 3.5744E−04 | 1.6737E−04 |
| S9 | −3.9328E−01 | −3.1731E−02 | −9.6095E−03 | −8.6487E−04 | 1.1514E−03 | 1.1496E−03 | 1.0270E−03 | 6.2154E−04 | 4.4335E−04 |
| S10 | −5.4550E−01 | −6.2138E−03 | −5.1096E−03 | 2.6244E−03 | 2.9666E−03 | 1.5950E−03 | 1.2272E−03 | 4.3728E−04 | 3.3508E−04 |
| S11 | −1.1597E+00 | 1.2534E−01 | 1.5442E−02 | 2.2301E−02 | 2.1617E−03 | −4.3130E−04 | −4.0849E−03 | −1.9148E−03 | −8.4557E−04 |
| S12 | −1.2984E+00 | 2.2960E−01 | −4.1657E−03 | 5.7109E−02 | −1.0596E−02 | 4.4599E−03 | −1.1502E−02 | −5.6241E−03 | −7.0221E−04 |
| S13 | −9.5381E−01 | 3.8222E−01 | −7.4380E−02 | 6.2303E−02 | −2.5321E−02 | 1.0822E−02 | −1.2192E−02 | 7.9200E−04 | 2.6532E−03 |
| S14 | −1.9333E+00 | 2.1876E−01 | −8.6036E−02 | 2.5756E−02 | −7.8864E−03 | 8.4792E−03 | −3.3860E−03 | 1.1126E−03 | −1.0213E−03 |

Figure 8A:
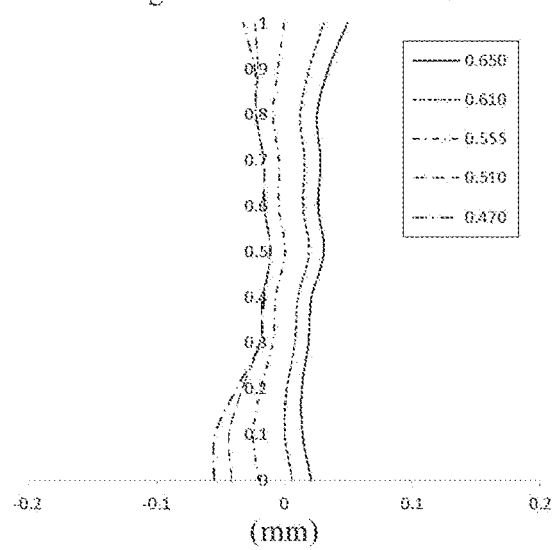
FIGS. 8A to 8D respectively show a longitudinal aberration curve, an astigmatic curve, a distortion curve and a lateral color curve of the optical imaging system according to Embodiment 4.
Figure 8B:
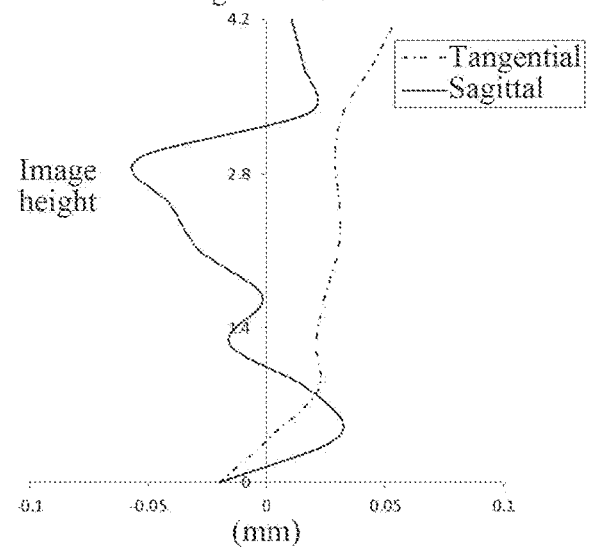
Figure 8C:
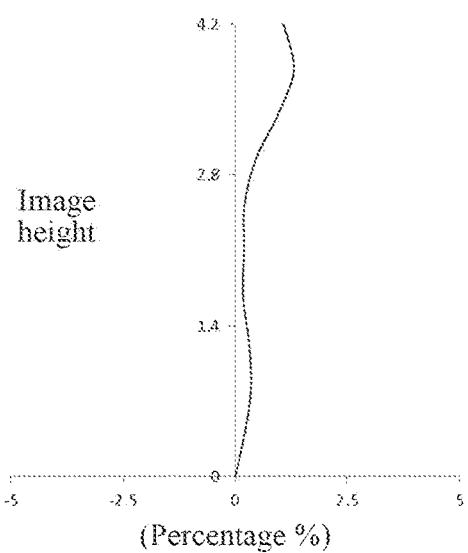
Figure 8D:
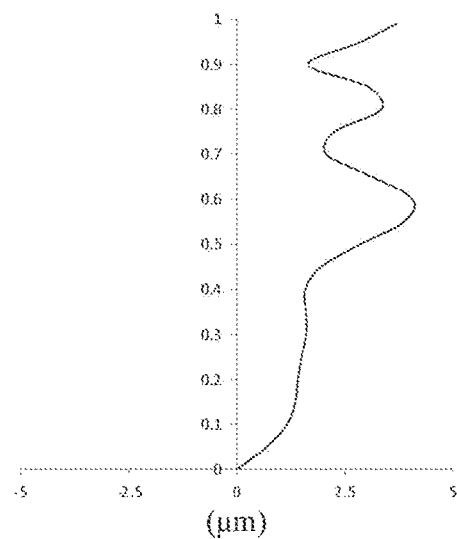

FIG. 8A illustrates a longitudinal aberration curve of the optical imaging system in Embodiment 4, representing deviations of focal points of light of different wavelengths converged after passing through a lens assembly. FIG. 8B illustrates an astigmatic curve of the optical imaging system in Embodiment 4, representing a curvature of a tangential image plane and a curvature of a sagittal image plane. FIG. 8C illustrates a distortion curve of the optical imaging system in Embodiment 4, representing amounts of distortion corresponding to different image heights. FIG. 8D illustrates a lateral color curve of the optical imaging system in Embodiment 4, representing deviations of different image heights on the image plane after light passes through the lens assembly. It can be seen from FIGS. 8A to 8D that the optical imaging system given in Embodiment 4 can achieve a good imaging quality.

Embodiment 5

Figure 9:
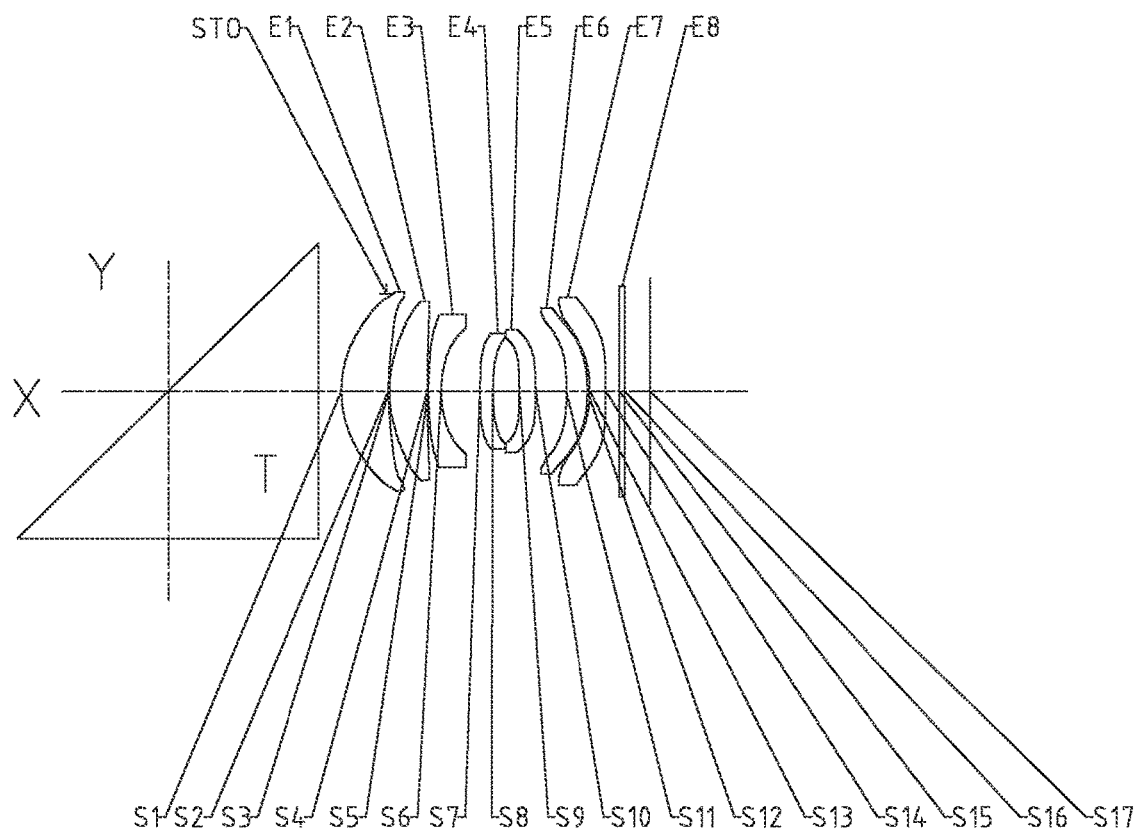
FIG. 9 is a schematic structural diagram of an optical imaging system according to Embodiment 5 of the present disclosure.

An optical imaging system according to Embodiment 5 of the present disclosure is described below with reference to FIGS. 9 to 10D. FIG. 9 is a schematic structural diagram of the optical imaging system according to Embodiment 5 of the present disclosure.

As shown in FIG. 9, the optical imaging system includes, sequentially from an object side to an image side, a prism T, a diaphragm STO, a first lens E1, a second lens E2, a third lens E3, a fourth lens E4, a fifth lens E5, a sixth lens E6, a seventh lens E7, an optical filter E8 and an image plane S17.

The prism T has a light incident surface, a light reflection surface and a light emergent surface. The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a convex surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces from the light incident surface of the prism T to the image-side surface S16 of the optical filter E8, and finally forms an image on the image plane S17.

In this example, a total effective focal length f of the optical imaging system is 12.02 mm, and a distance TTL from the object-side surface S1 of the first lens E1 to the image plane S17 of the optical imaging system on an optical axis is 11.50 mm. Half of a diagonal length ImgH of an effective pixel area on the image plane S17 of the optical imaging system is 4.20 mm. Half of a maximal field-of-view Semi-FOV of the optical imaging system is 19.1°.

Table 9 is a table showing basic parameters of the optical imaging system in Embodiment 5. Here, the units of a radius of curvature, a thickness/distance and a focal length are millimeters (mm). Table 10 shows the high-order coefficients applicable to the aspheric surfaces in Embodiment 5. Here, the surface type of each aspheric surface may be defined using the formula (1) given in Embodiment 1.

TABLE 9

| surface number | surface type | radius of curvature | thickness/ distance | material refractive index | abbe number | focal length | conic coefficient |
|---|---|---|---|---|---|---|---|
| OBJ | spherical | infinite | infinite | | | | |
| | spherical | infinite | −3.4000 | 1.91 | 31.3 | | |
| | spherical | infinite | 3.4000 | | | | |
| | spherical | infinite | 0.0000 | | | | |
| | spherical | infinite | 1.9714 | | | | |
| STO | spherical | infinite | −1.9714 | | | | |
| S1 | aspheric | 4.1731 | 1.7479 | 1.55 | 55.8 | 11.67 | −0.3384 |
| S2 | aspheric | 10.3075 | 0.0400 | | | | 1.2691 |
| S3 | aspheric | 5.2341 | 1.4043 | 1.55 | 55.8 | 10.69 | 0.2454 |
| S4 | aspheric | 46.1248 | 0.0400 | | | | 89.8899 |
| S5 | aspheric | 10.4352 | 0.4700 | 1.68 | 19.2 | −9.95 | 7.3536 |
| S6 | aspheric | 4.0204 | 1.4462 | | | | 0.8473 |
| S7 | aspheric | 24.5265 | 0.4800 | 1.55 | 55.8 | −26.54 | 24.2401 |
| S8 | aspheric | 9.0447 | 0.9892 | | | | 11.2160 |
| S9 | aspheric | −283.4155 | 0.6042 | 1.68 | 19.2 | 1000.01 | −99.0000 |
| S10 | aspheric | −200.0000 | 1.1333 | | | | −99.0000 |
| S11 | aspheric | −94.0286 | 0.8136 | 1.64 | 23.5 | −578.37 | 39.0000 |
| S12 | aspheric | −126.1694 | 0.0884 | | | | −11.2765 |
| S13 | aspheric | −22.4841 | 0.5800 | 1.55 | 55.8 | −26.65 | 46.3954 |
| S14 | aspheric | 41.6012 | 0.5170 | | | | 90.0000 |
| S15 | spherical | infinite | 0.2100 | 1.52 | 64.2 | | |
| S16 | spherical | infinite | 0.9358 | | | | |
| S17 | spherical | infinite | | | | | |

TABLE 10

| surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | −4.0946E−02 | 2.9585E−02 | 2.5700E−02 | 1.0472E−02 | 2.2012E−03 | −7.2760E−05 | −3.7402E−04 | −2.1741E−04 | −8.5753E−05 |
| S2 | −2.1841E−01 | 1.1769E−01 | 1.6875E−02 | −1.3007E−03 | −5.0541E−04 | −1.9220E−03 | −5.6329E−04 | 2.9403E−06 | 5.1345E−05 |
| S3 | −1.4311E−01 | 3.3106E−02 | 1.3213E−02 | −5.1640E−03 | −1.2825E−03 | −1.6750E−03 | −7.3341E−04 | 1.0999E−04 | 2.2151E−04 |
| S4 | −4.0155E−02 | −9.0668E−04 | 5.0474E−03 | 4.0449E−03 | −5.8265E−03 | 2.1067E−03 | −8.1039E−04 | 6.4677E−04 | −2.9091E−04 |
| S5 | −1.2237E−01 | 5.7307E−02 | −2.5239E−02 | 1.0220E−02 | −5.6589E−03 | 1.1292E−03 | −4.5074E−04 | 3.5085E−04 | −1.4441E−04 |
| S6 | 3.6855E−02 | 5.5419E−02 | −1.2085E−02 | 4.2161E−04 | −2.0104E−03 | −7.0618E−04 | −2.7111E−04 | −4.0047E−05 | −1.5757E−05 |
| S7 | 2.5806E−01 | 3.4796E−02 | −2.4411E−04 | 2.3363E−03 | 7.9757E−05 | −2.6817E−05 | −4.8412E−05 | −3.5350E−05 | −1.1697E−05 |
| S8 | 1.4025E−01 | 2.3159E−02 | −1.4919E−03 | 1.9364E−03 | 5.1265E−04 | 3.0309E−04 | 1.2357E−04 | 7.6445E−05 | 3.1036E−05 |
| S9 | −4.3478E−01 | −2.0947E−02 | −1.4435E−02 | −1.2228E−03 | 2.5608E−04 | 8.0358E−04 | 4.7761E−04 | 3.3997E−04 | 1.6231E−04 |
| S10 | −6.6003E−01 | 1.2419E−01 | −1.1341E−02 | 5.4480E−03 | 2.9792E−03 | 2.1053E−03 | 8.4614E−04 | 4.7169E−04 | 1.5969E−04 |
| S11 | −1.0598E+00 | 1.5503E−01 | −1.2068E−02 | 2.8323E−02 | 8.3484E−03 | 1.5417E−04 | −3.5167E−03 | −6.3657E−04 | −6.9728E−04 |
| S12 | −1.5971E+00 | 3.5207E−01 | −9.3010E−02 | 6.4094E−02 | −1.8628E−02 | 1.6114E−02 | −1.2429E−02 | 6.5256E−03 | −5.7966E−03 |
| S13 | −1.2297E+00 | 5.1488E−01 | −9.6341E−02 | 5.6176E−02 | −4.1248E−02 | 2.3285E−02 | −1.5062E−02 | 1.0053E−02 | −7.9258E−03 |
| S14 | −1.4139E+00 | 1.6570E−01 | −1.5409E−02 | 1.1366E−02 | −5.5079E−03 | 3.5325E−03 | −3.3418E−03 | 9.7520E−04 | −1.9862E−03 |

Figure 10A:
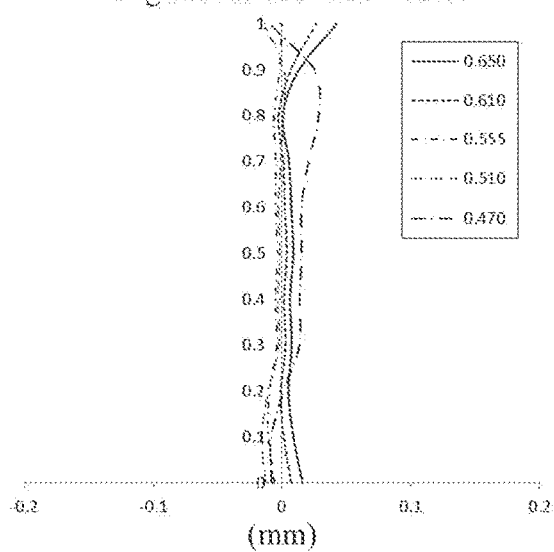
FIGS. 10A to 10D respectively show a longitudinal aberration curve, an astigmatic curve, a distortion curve and a lateral color curve of the optical imaging system according to Embodiment 5.
Figure 10B:
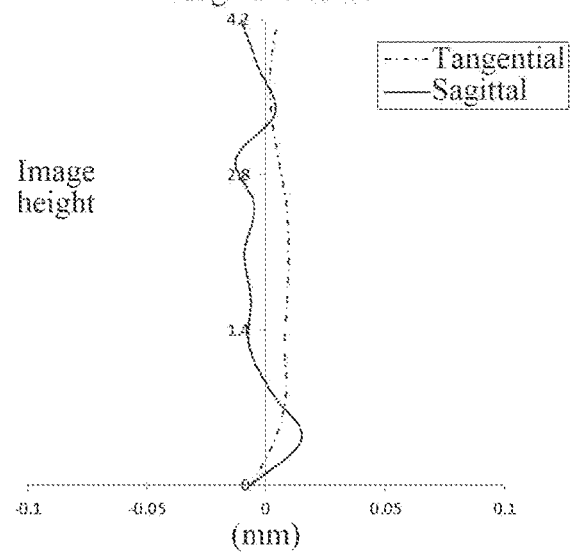
Figure 10C:
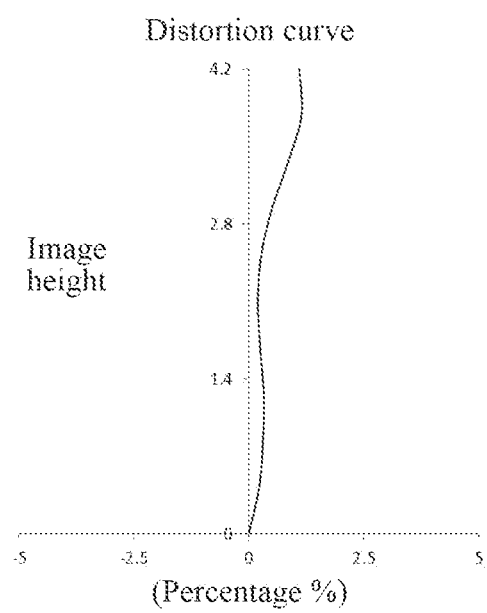
Figure 10D:
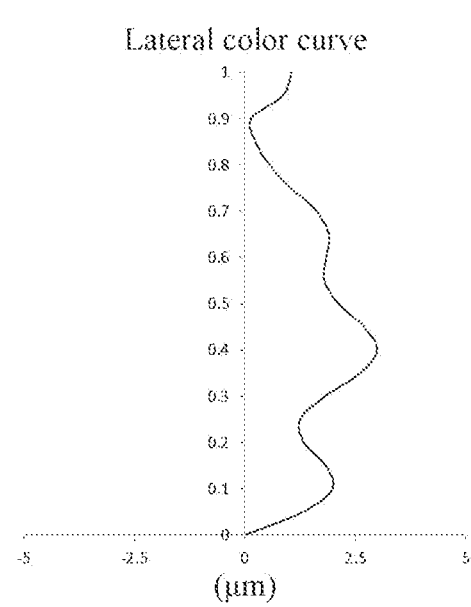

FIG. 10A illustrates a longitudinal aberration curve of the optical imaging system in Embodiment 5, representing deviations of focal points of light of different wavelengths converged after passing through a lens assembly. FIG. 10B illustrates an astigmatic curve of the optical imaging system in Embodiment 5, representing a curvature of a tangential image plane and a curvature of a sagittal image plane. FIG. 10C illustrates a distortion curve of the optical imaging system in Embodiment 5, representing amounts of distortion corresponding to different image heights. FIG. 10D illustrates a lateral color curve of the optical imaging system in Embodiment 5, representing deviations of different image heights on the image plane after light passes through the lens assembly. It can be seen from FIGS. 10A to 10D that the optical imaging system given in Embodiment 5 can achieve a good imaging quality.

In summary, Embodiments 1 to 5 respectively satisfy the relationships shown in Table 11.

TABLE 11

| conditional expression | embodiment | | | | |
|---|---|---|---|---|---|
| | 1 | 2 | 3 | 4 | 5 |
| f/EPD | 1.62 | 1.62 | 1.62 | 1.62 | 1.62 |
| f7/f2 | −2.71 | −2.52 | −2.47 | −1.30 | −2.49 |
| f4/f | −2.20 | −2.93 | −3.38 | −1.56 | −2.21 |
| R4/f2 | 4.82 | 4.76 | 4.62 | 3.42 | 4.32 |
| f3/R6 | −2.45 | −2.72 | −2.74 | −3.01 | −2.47 |
| R2/R1 | 2.49 | 1.65 | 1.66 | 1.68 | 2.47 |
| R4/R5 | 4.82 | 4.77 | 4.72 | 3.76 | 4.42 |
| R7/R8 | 2.95 | 1.42 | 1.39 | 2.07 | 2.71 |
| R12/R13 | 5.51 | 7.26 | 7.24 | 7.79 | 5.61 |
| T34/CT3 | 3.12 | 2.81 | 2.73 | 3.12 | 3.08 |
| T56/CT5 | 1.82 | 1.81 | 1.75 | 1.92 | 1.88 |
| T45/CT4 | 1.98 | 1.71 | 1.59 | 2.03 | 2.06 |
| CT1/CT6 | 2.14 | 1.65 | 1.47 | 2.22 | 2.15 |
| CT2/CT7 | 2.41 | 2.33 | 2.21 | 2.80 | 2.42 |

The present disclosure further provides an imaging apparatus having an electronic photosensitive element which may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in the present disclosure with (but not limited to) technical features with similar functions.

What is claimed is:

1. An optical imaging system, comprising:
   a prism, the prism reflecting light incident to the prism along a first direction, to cause the light to emerge from the prism along a second direction;
   wherein the optical imaging system further comprises, sequentially from the prism to an image side along the second direction:
   a diaphragm;
   a first lens, having a positive refractive power;
   a second lens, having a positive refractive power, an image-side surface of the second lens being a concave surface;
   a third lens, having a negative refractive power;
   a fourth lens, having a negative refractive power, an image-side surface of the fourth lens being a concave surface;
   a fifth lens, having a positive refractive power;
   a sixth lens, having a negative refractive power; and
   a seventh lens, having a refractive power,
   wherein at least one of surfaces from an object-side surface of the first lens to an image-side surface of the seventh lens is an aspheric surface;
   wherein a radius of curvature R12 of an image-side surface of the sixth lens and a radius of curvature R13 of an object-side surface of the seventh lens satisfy:

$5.5 < R12/R13 < 8.0$.

2. The optical imaging system according to claim 1, wherein an effective focal length f7 of the seventh lens and an effective focal length f2 of the second lens satisfy: $-3.0 < f7/f2 < -1.0$.

3. The optical imaging system according to claim 1, wherein an effective focal length f4 of the fourth lens and a total effective focal length f of the optical imaging system satisfy:

$-3.5 < f4/f < -1.5$.

4. The optical imaging system according to claim 1, wherein a radius of curvature R4 of the image-side surface of the second lens and the effective focal length f2 of the second lens satisfy: $3.0 < R4/f2 < 5.0$.

5. The optical imaging system according to claim 1, wherein an effective focal length f3 of the third lens and a radius of curvature R6 of an image-side surface of the third lens satisfy: $-3.5 < f3/R6 < -2.0$.

6. The optical imaging system according to claim 1, wherein a radius of curvature R1 of the object-side surface of the first lens and a radius of curvature R2 of an image-side surface of the first lens satisfy: $1.5 < R2/R1 < 2.5$.

7. The optical imaging system according to claim 1, wherein the radius of curvature R4 of the image-side surface of the second lens and a radius of curvature R5 of an object-side surface of the third lens satisfy: $3.5 < R4/R5 < 5.0$.

8. The optical imaging system according to claim 1, wherein a radius of curvature R7 of an object-side surface of the fourth lens and a radius of curvature R8 of the image-side surface of the fourth lens satisfy: $1.0 < R7/R8 < 3.0$.

9. The optical imaging system according to claim 1, wherein a center thickness CT3 of the third lens on an optical axis and a spacing distance T34 between the third lens and the fourth lens on the optical axis satisfy: $2.5 < T34/CT3 < 3.5$.

10. The optical imaging system according to claim 1, wherein a center thickness CT5 of the fifth lens on an optical axis and a spacing distance T56 between the fifth lens and the sixth lens on the optical axis satisfy: $1.5 < T56/CT5 < 2.0$.

11. The optical imaging system according to claim 1, wherein a center thickness CT4 of the fourth lens on an optical axis and a spacing distance T45 between the fourth lens and the fifth lens on the optical axis satisfy: $1.5 < T45/CT4 < 2.1$.

12. The optical imaging system according to claim 1, wherein a center thickness CT1 of the first lens on an optical axis and a center thickness CT6 of the sixth lens on the optical axis satisfy: $1.0 < CT1/CT6 < 2.5$.

13. The optical imaging system according to claim 1, wherein a center thickness CT2 of the second lens on an optical axis and a center thickness CT7 of the seventh lens on the optical axis satisfy: $2.0 < CT2/CT7 < 3.0$.

14. The optical imaging system according to claim 1, wherein a maximal field-of-view FOV of the optical imaging system satisfies: $35° < FOV < 45°$.

15. The optical imaging system according to claim 1, wherein the total effective focal length f of the optical imaging system satisfies: $f \geq 11$ mm.

16. The optical imaging system according to claim 1, wherein the total effective focal length f of the optical imaging system and an entrance pupil diameter EPD of the optical imaging system satisfy: $f/EPD < 1.7$.

* * * * *